United States Patent [19]

Tippner

[11] 4,214,178

[45] Jul. 22, 1980

[54] ROTATING ELECTROMAGNETIC SOLENOID MOTOR

[76] Inventor: Richard E. Tippner, 2050 NE. 39th St., Apt. 109 South, Lighthouse Point, Fla. 33069

[21] Appl. No.: 956,601

[22] Filed: Nov. 2, 1978

Related U.S. Application Data

[63] Continuation of Ser. No. 574,751, May 5, 1975, abandoned, Continuation-in-part of Ser. No. 278,721, Aug. 8, 1972, abandoned.

[51] Int. Cl.² .................................................. H02K 37/00
[52] U.S. Cl. .......................................... 310/14; 310/46
[58] Field of Search .................................. 310/12–14, 310/46, 83

[56] References Cited

U.S. PATENT DOCUMENTS

| 517,858 | 4/1894 | Greenfield | 310/14 |
|---|---|---|---|
| 741,325 | 10/1903 | Gibbs | 310/83 |
| 1,068,531 | 7/1913 | Rhodes | 310/14 |
| 1,069,291 | 8/1913 | Rhodes | 310/46 |
| 1,132,445 | 3/1915 | Conrad | 310/14 |
| 1,222,692 | 4/1917 | Spangler | 310/12 |
| 1,231,193 | 6/1917 | Powers | 310/46 X |
| 3,665,227 | 5/1972 | Busch | 310/46 |
| 3,832,581 | 8/1974 | Hoffman et al. | 310/46 |

Primary Examiner—Donovan F. Duggan
Attorney, Agent, or Firm—Joseph Zallen

[57] ABSTRACT

A motor comprising a plurality of electromagnetic solenoids forming a core passageway for an armature consisting of alternatingly magnetizable and non-magnetic elements. Only one magnetizable element is in an energized solenoid at any given time, thus providing lower current requirements.

6 Claims, 6 Drawing Figures

ROTATING ELECTROMAGNETIC SOLENOID MOTOR

This application is a continuation of Ser. No. 574,751, May 5, 1975, now abandoned; and which is a Continuation-In-Part of Ser. No. 278,721, filed Aug. 8, 1972 abandoned.

BACKGROUND OF INVENTION

This invention relates to a direct current solenoid motor which can be used for heavy loads at low currents, as for example, in electric automobiles without burning up the motor. Such a motor does not depend upon counter-electromotive force for its resistance.

Examples of previously described solenoid motors include Rhodes, U.S. Pat. No. 1,068,531 and Greenfield, U.S. Pat. No. 517,858. However, solenoid motors that have been previously described are low in efficiency.

One object of the present invention is to provide a solenoid motor which has greater efficiency than those previously described. A further object of this invention is to provide a long-lasting direct current electric motor or combination of such motors which can be used in fixed speed electric automobiles or lift trucks or the like.

Other objects and advantages of the present invention will be apparent from the specification and claims which follow taken together with the appended drawings.

SUMMARY OF INVENTION

The invention comprises broadly a motor comprising a plurality of electromagnetic solenoids spaced apart on a frame in a circular pattern and including a core passageway through which a rotatable, circular armature passes. The armature has a plurality of spaced, magnetizable elements separated by non-magnetic elements. Means are provided for electrically energizing the solenoids one at a time and in sequence. An output shaft is coupled to the armature. Each of the magnetizable elements is equal in length to the axial length of the solenoids and each of the solenoids are of equal length. The energizing means is arranged so that a predetermined portion of a magnetic element enters the solenoid before that solenoid is energized. It is preferred that there be a predetermined attraction distance "X" between the end of an armature segment and the end of a solenoid, which distance "X" is one-third the length of the solenoid and the distance between the solenoids, the solenoid being energized when the magentizable element has moved two-thirds into said solenoid.

The armature has means for coupling to an output shaft. Preferably the armature includes gearing means cooperant with gearing means on the output shaft.

The physical dimensions of the solenoid array and the armature are so selected that only one magnetizable element will be in an energized solenoid at any given time. As a particular magnetizable element is attracted to a solenoid, the adjacent magnetizable element will be moved into the predetermined position and the next adjacent solenoid which will be energized as soon as the prior solenoid has been de-energized. In this manner, there is a sequence of separate sequential energizing of a solenoid that has been partially penetrated by a magnetizable element.

As an example of materials of constructions and dimensions, the magnetizable elements can be separated by a non-magnetic material such as stainless steel with segments of about two and a half inches in length. Each of the magnetizable elements are equal in length to the solenoid axial length including the laminated steel exterior shell of about three and three quarters inches in length. The preferred distance of attraction is thus one third thereof or one and one quarter inches. The space between the solenoids is the same length also, one and one quarter inches. The system can be run on a low voltage as for example 12, 24, or 36 volts DC battery current or any other higher voltage DC current. The attraction can be designed in the range of 12 to 200 pounds depending upon the coil winding. The magnetic material of the coil shell should be a highly permeable material to insure high intensity in the field surrounding the solenoid. The magnetizable strength of the motor is a function of the number of turns of wire in the coils and for maximum efficiency the distance of attraction should generally be kept in the range of a few inches.

The current required to energize the solenoid motor of this invention is quite low compared to the prior art, because only one solenoid need be energized at any given time, since the solenoids are energized in sequence and not simultaneously. The efficiency of the motor is very high because the solenoids are energized in sequence only when the magnetizable element has entered into the zone of the greatest density of magnetic lines of force, that is, for example two thirds in, and also does not require a counter-electromotive force for resistance. The coils of the solenoid are wound for the resistance that is required for the voltage and current needed.

The motor of this invention is particularly advantageous because it can take overloads inasmuch as the resistance of the solenoid coils limits the flow of current. Only a rheostat is needed to control the speed of the motor.

The present invention also contemplates that a plurality of such solenoid motors may be combined. The individual motors can be on the same drive shaft and the solenoids can be energized in sequence, one solenoid from one unit and then one from another unit. It is preferred that when multiple solenoid motors in accordance with this invention are mechanically coupled to the same drive shaft they be energized in some overlapping sequence rather than directly after. Thus, where two solenoid motors are to be coupled mechanically together the first motor will have its one energizing solenoid at its peak attraction slightly ahead of the energizing solenoid in the second motor. In general, the solenoids in the sequence can be energized so that when one has reached one half the attraction distance, the solenoid on the next motor is then energized and so forth. This provides a maximum of peak attraction throughout a single revolution.

Thus, for example, here three coupled solenoid motors are to be used, a magnetic element has entered two thirds (2 "X" distance" into the core of a solenoid in the first motor while the corresponding magnetic segment in the second motor is one and one third "X" distance in and the magnetizable element of the third motor is one and two thirds the distance of the attracting distance of the solenoid in the first unit. In this way one solenoid is starting its attraction, one is at its center attraction and the other is at its peak attraction. As the magnetic segment of the magnetizable element leading pole passes through a solenoid, the solenoid is de-energized one degree before it reaches its final attracting distance so that the lateral pole is not attracted as the magnetic pole leaves the solenoid.

SPECIFIC EXAMPLES OF INVENTION

Figure 1:
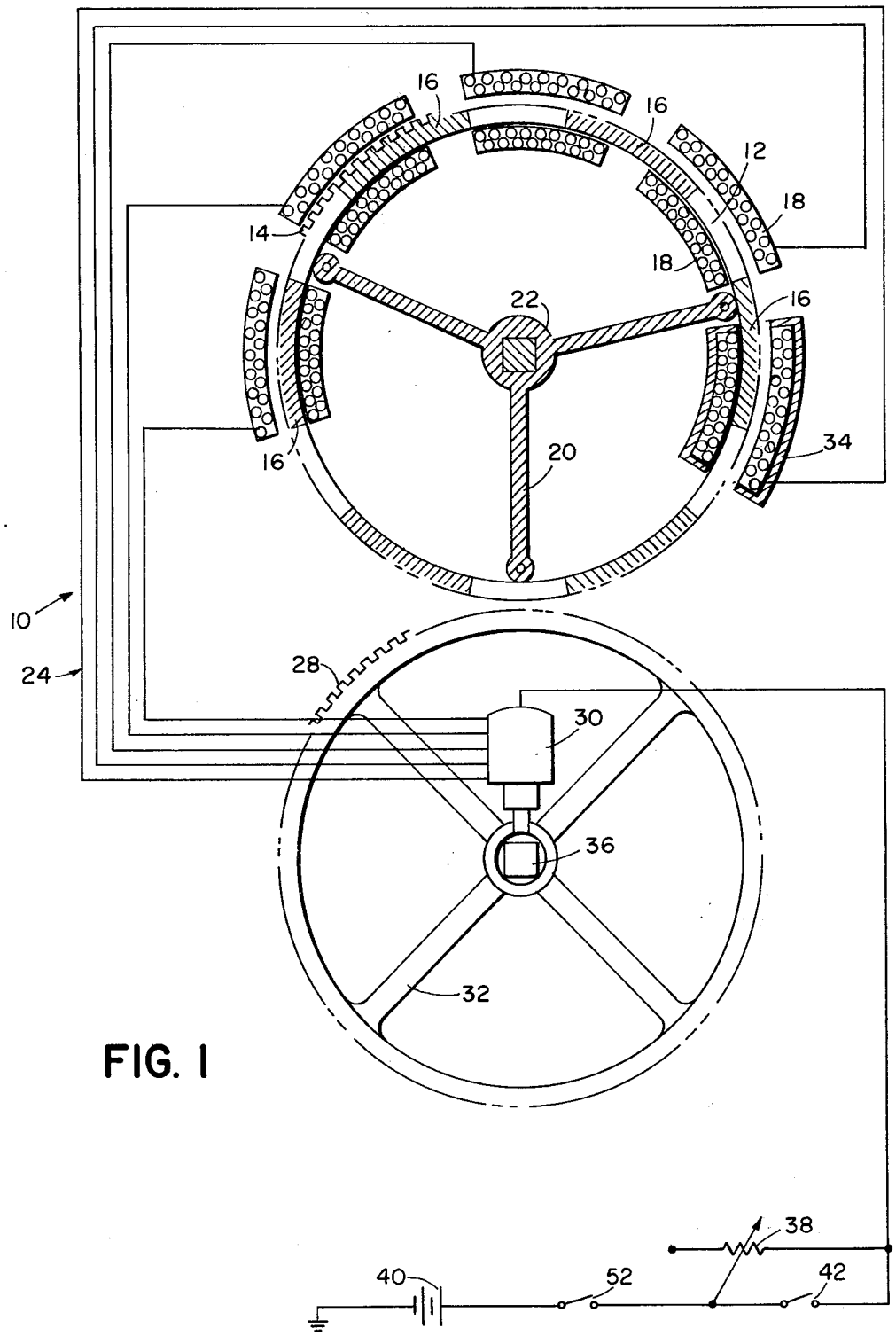
FIG. 1 shows a cross-sectional schematic of one embodiment of the applicant's invention.
Figure 2:
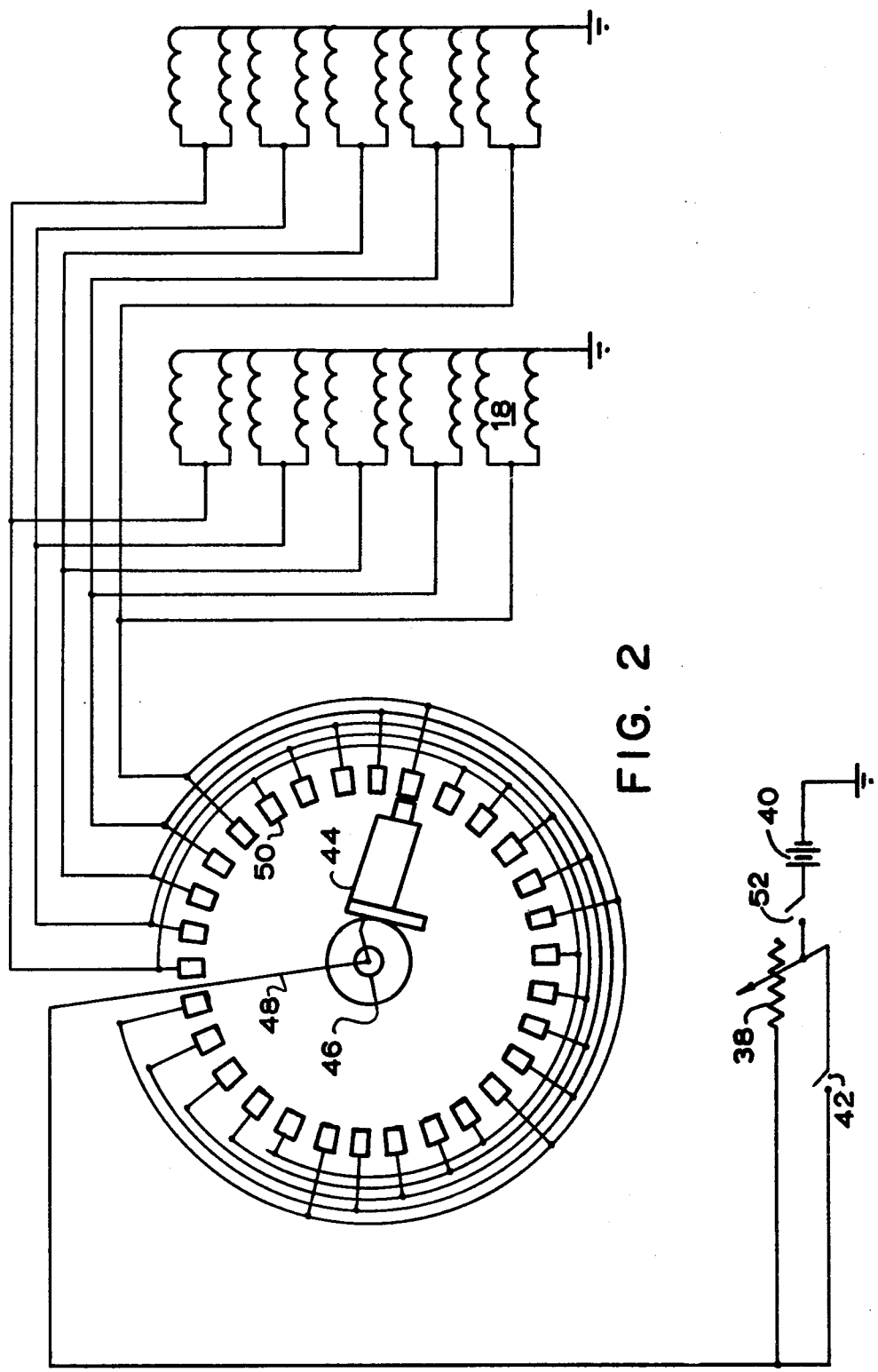
FIG. 2 shows a schematic diagram of the power source of the applicant's invention.
Figure 3:
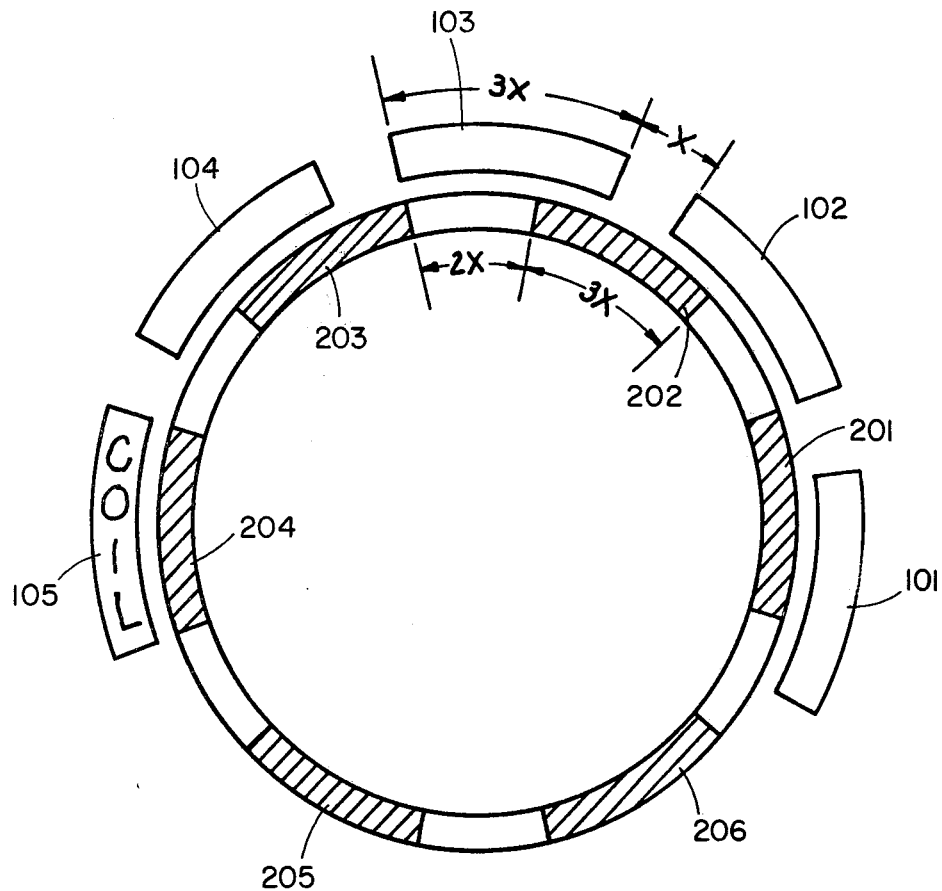
FIG. 3 shows a functional schematic diagram of the difference sequences of armature operation in accordance with the applicant's invention.

Referring now to FIGS. 1-3 in the drawings, a preferred embodiment of Applicant's invention 10 is shown in FIG. 1. The driving unit is comprised of a plurality of electromagnetic solenoids 18, comprised of helically wound coils of wire surrounded by highly magnetizable material 34 (shown on one coil only for clarity).

The solenoids are of essentially the same dimension and are spaced apart on two circular rims of non-magnetic material (not shown) a predetermined distance. The solenoid coils are donut shaped in cross section and have an interior aperture that permits an armature gear 12 to be placed in the center of the coils where full strength is maximum.

Moving armature 14 is a circular gear having a plurality of highly magnetized segments 16 separated by non-magnetic insulators. The gear freely rotates around spokes 20. The number of coils are chosen to provide smooth power output. The armature gear is meshed to a drive shaft gear 28 for which the particular type of mechanical motion is to be used. The particular axial length of each solenoid and the distance between the solenoids are important in the operation of applicant's invention. Adjacent solenoids are energized to provide north-south orientation which attracts the closer pole of the magnetic segments 16. As the armature magnetic segment leading pole passes through the solenoid, the solenoid is de-energized so that the latter pole is not attracted as the pole leaves the solenoid.

The particular shape of the gear teeth are not deemed critical to the operation of applicant's invention, but merely shown as preferred embodiment.

Spoke housing 22 supports and also keeps the armature gear in alignment. The spokes 20 have roller bearings at the ends contacting the armature gear.

FIG. 2 shows a distributor 46 comprising thirty copper segments 50, brush-holder 44, carbon brush, gear and lever for securing to a frame.

FIG. 2 shows the circuit diagram for achieving an electrical pulsing sequence for generating and driving the coils 18 in a particular time relationship with each other. A battery or DC voltage source is connected to two switches 42 and 52. Switch 52 is shunted across the rheostat and switch 42 is connected in series with rheostat 38, then to top of distributor to make contact with brush of the distributor.

The distributor brush makes contact with only one segment at a time which energizes one pair of coils (for a double armature unit).

One clockwise revolution of the brush around the distributor energizes each coil six times. The distributor is geared for the same ratio as the armature gear. As the solenoid attracts "X" distance, the distributor brush rotates to the adjacent copper segment. When starting the motor, both switches 42 and 52 are closed so that the coils get full voltage and have the most attracting power. When the motor is up to full speed, switch 42 is opened, allowing rheostat 44 to control.

FIG. 3 illustrates the basic sequential operation of the invention. The armature is shown having six magnetizable segments 201-206 rotating clockwise through solenoid coils 101-105. A predetermined attraction distance is established between the end of an armature segment and end of the solenoid shell. This is the distance that one magnetizable armature segment must be attracted relative to a solenoid coil in order to place the armature in a neutral position with respect to that coil and is shown in FIG. 3 as a distance "X". The dimension of the armature and the coils and the distance separating these from each other are chosen so that this distance from the initial rest position of the motor increases sequentially from each adjacent coil. For smoothest power output, the best sequence would allow adjacent coils to be pulsed in step while the magnetizable segments on the armature gear are positioned adjacent each coil in the best attractive position. The distributor is geared to the armature gear rotation to compensate for increased or decreased armature speeds. The pattern is repeated until each solenoid has been pulsed for each magnetic segment on the armature gear. In FIG. 3, magnetizable segment 201 is two-thirds into solenoid coil 101, which coil is just being energized. Segment 201 will be pulled a distance "X" clockwise, the coil 101 will be de-energized and coil 102 now energized so as to act on segment 202, now in two-thirds "X" in coil 102, etc.

In operation, the drive shaft 36 in FIG. 1 may be coupled to any mechanical device that is to provide a rotational motion. The relative dimension between the armature and the electromagnetic coils is considered important for the operation of applicant's invention.

Figure 4:
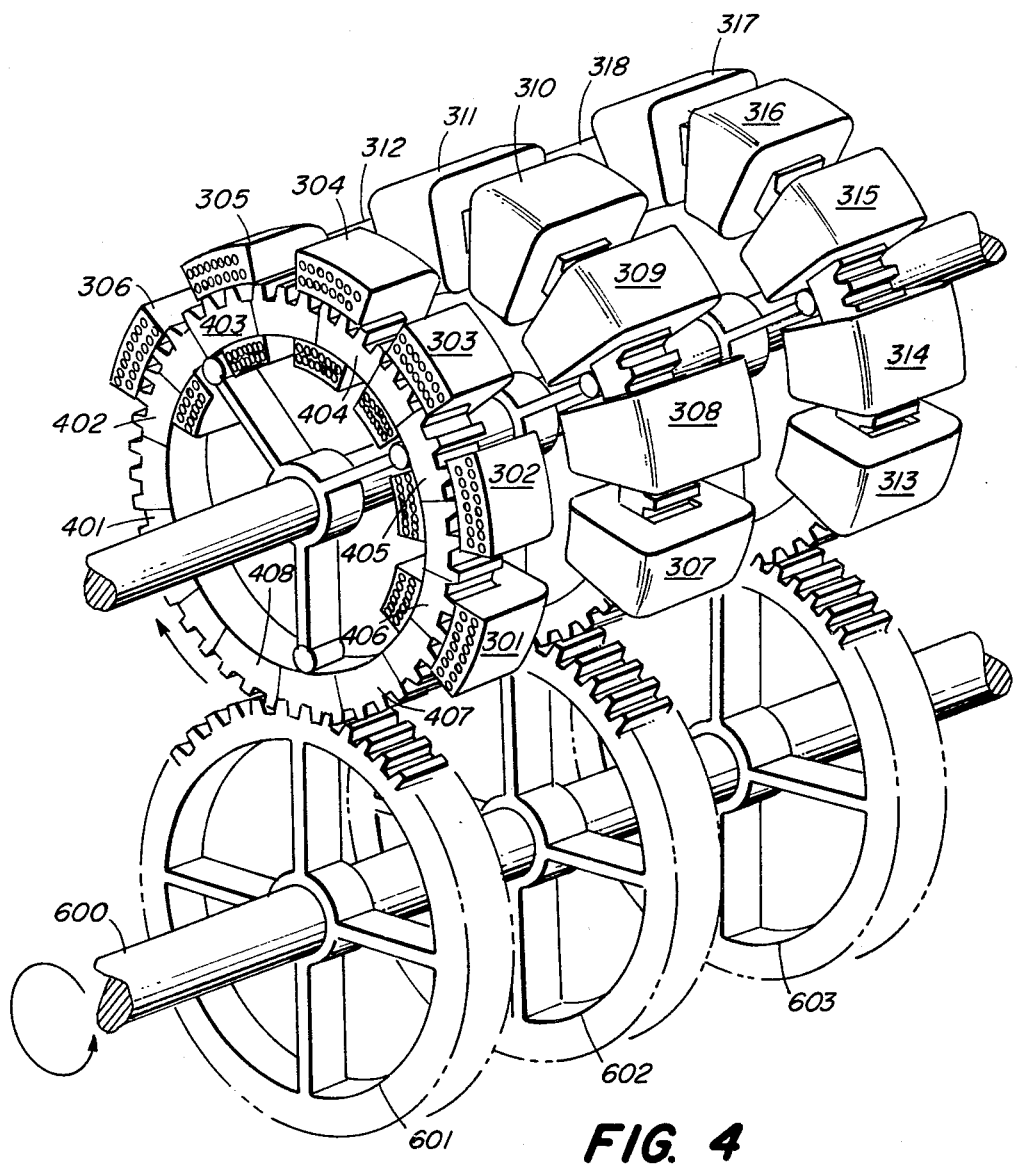
FIG. 4 shows a schematic view of three solenoid motors made in accordance with this invention and mechanically coupled to the same drive shaft.
Figure 5:
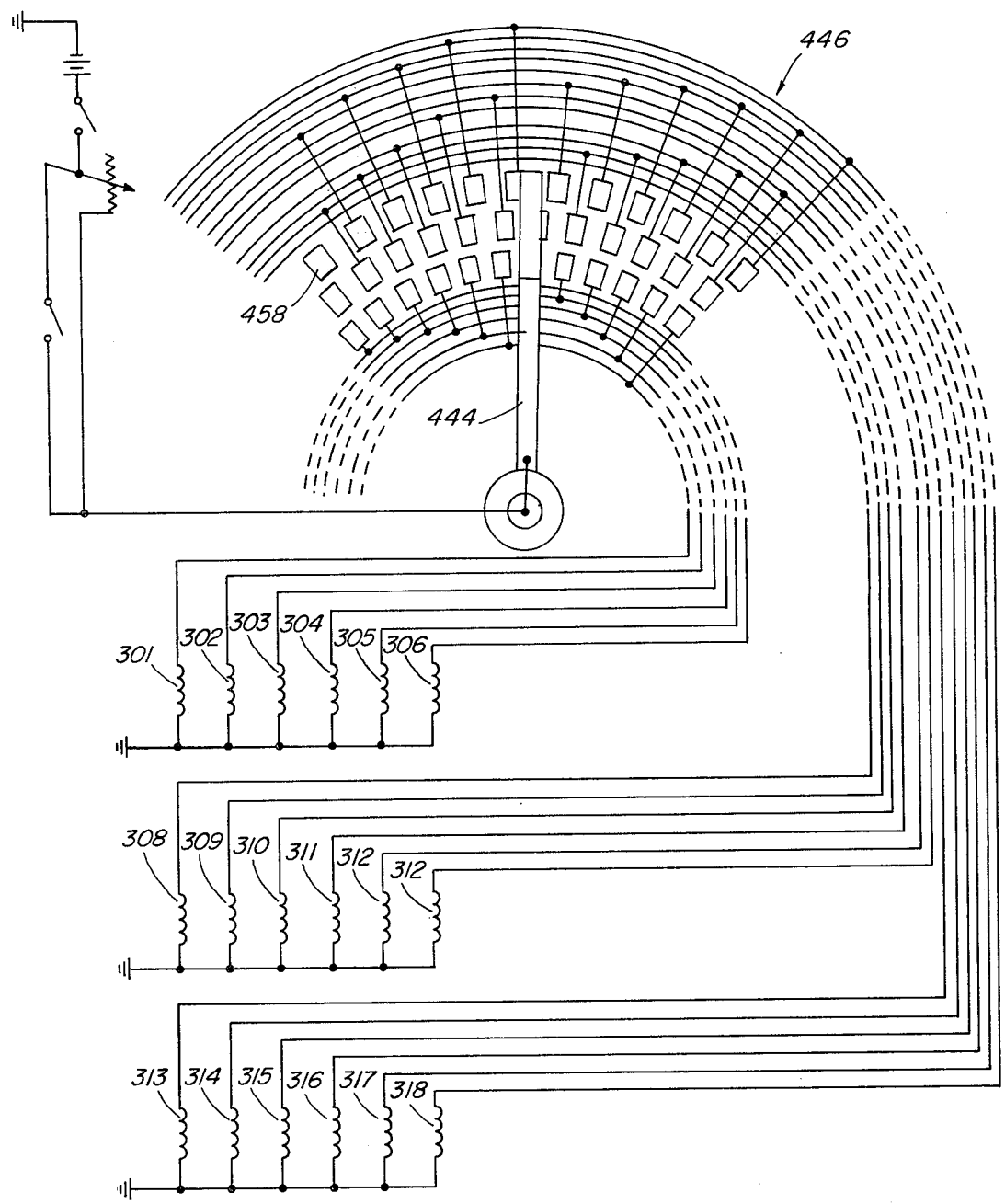
FIG. 5 shows a partial schematic diagram of the energizing of the various solenoids illustrated in FIG. 4.
Figure 6:
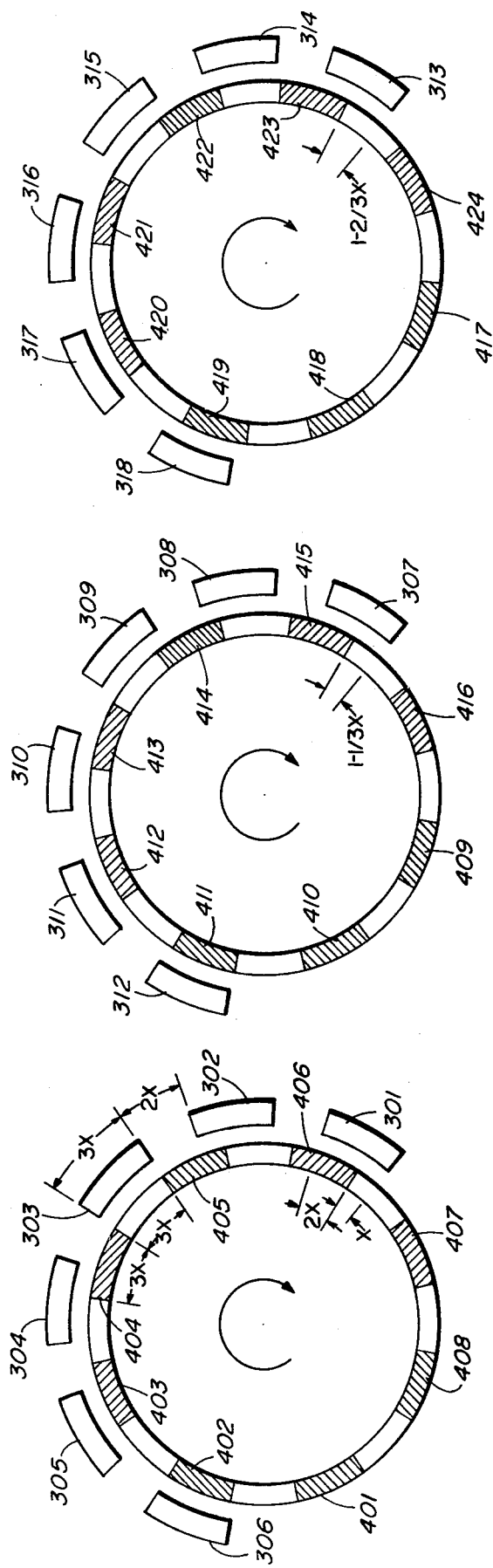
FIG. 6 is a schematic diagram showing the function and sequences of the operation of the three motors illustrated in FIG. 4.

Reference is now made to FIGS. 4-6 which illustrates a second embodiment of this invention. Three solenoid units are combined. Each unit consists of six solenoids 301-306, 307-312, 313-318 and an armature ring gear having eight magnetizable segments, 401-408, 409-416 and 417-424. The magnetizable segments are separated from each other by non-magnetizable segments of equal length. All of the segments and solenoids are thus of equal length. The solenoids in each unit are energized in sequence, but each unit is energized at a different interval in order that the power of attraction be equally distributed throughout the revolution.

The armature gear of the first unit is placed so that the magnetic segment (406) of its armature has entered two-thirds (2X) distance into the core of solenoid (301) or (X) distance from the lower end of solenoid (301), which is the attracting end of solenoid (301). The armature gear of the second unit is placed so that the magnetic segment of the armature gear is one and one-third ($1\frac{1}{3}$X) distance of the attracting distance of solenoid (307) of that unit. The armature gear of the third unit is placed so that the magnetic segment of its armature gear is one and two-thirds (1⅔X) distance of the attracting distance of solenoid (313) of that unit.

The energizing of a solenoid is arranged to take place only when the magnetic segment of the armature is in an efficient position, that is, when the magnetic segment of the armature gear has entered two-thirds (2X) distance into the solenoid or the "X" distance (15) of the attraction end. As a solenoid of the first unit is energized and has attrected the magnetic segment of the armature gear one-third of the attracting distance, a solenoid of the second unit is energized and when that has attracted the magnetic segment of its armature gear one-third of the attracting distance, a solenoid of the third unit is energized and when that has attracted the magnetic segment of its armature gear one-third distance, the adjacent solenoid of the first unit is energized, etc. In this way one solenoid is starting its attraction, one is at its center attraction and the other is at its peak attraction. As the magnetic segment of the armature gear leading pole passes through the solenoid, the solenoid is de-energized one degree before reaching the final attracting distance, so that the lateral pole is not attracted as the magnetic pole leaves the solenoid. Each solenoid is energized eight times per revolution.

FIG. 5 shows a distributor (46) comprising of 48 copper segments (58) for each unit, brush and brush holder (44). A brush is energized by a battery after the switches are closed. The brush always makes contact with three segments at a time, one from each unit. One revolution of the brush around the distributor energizes each solenoid eight times. The distributor is geared for the same ratio as the armature gear.

By having three units in parallel and energized at different intervals there is an even pull at any one time. One solenoid in each unit is energized and energization begins at the time when a magnetic segment is at a position of maximum attraction in the solenoid, namely, the 2X distance. De-energization takes place just before, as for example, one degree, the magnetic segment is completely into the solenoid.

I claim:

1. An electric motor unit comprising:
   (a) A frame;
   (b) a plurality of at least five electro-magnetic solenoids of equal axial length spaced apart on the frame in a circular pattern and including a core passageway, said solenoids being grouped together in an array with uniform separations in the array which are smaller than the length of the solenoid, the portion unoccupied by solenoids being substantially greater than the length of a solenoid;
   (c) a rotatable circular armature coupled to the frame and having a plurality in excess of the number of solenoids of spaced, magnetizable elements separated by non-magnetizable elements, said elements being arranged to pass through said core passageway;
   (d) means for electrically energizing said solenoids one at a time and in sequence so that during one revolution each solenoid is energized the same number of times as there are magnetic segments in the armature;
   (e) an output shaft coupled to said armature; each of said magnetizable elements being equal in length to said solenoid axial length; said energizing means being so arranged that a solenoid is energized when the magnetizable element is two-thirds into the solenoid and after said magnetic element has been pulled in the remaining one-third, said solenoid is de-energized and the next adjacent solenoid is energized.

2. The electric motor unit of claim 1 wherein said armature has gearing means on its outer rim and said output shaft has means cooperant with said gearing means.

3. The electric motor unit of claim 1 wherein there are six solenoids and eight magnetizable elements with the distance between solenoids being two-thirds the length of a magnetizable element.

4. The electric motor unit of claim 1 wherein there are five solenoids and six magnetizable elements and the distance between solenoids is one-third the length of a magnetizable element.

5. Three electric motor units each made in accordance with claim 3, coupled to a common output shaft and being so mounted and controlled that at any one time only one solenoid in each motor unit is energized but the first motor unit having its solenoid energized one-third the length of a magnetizable element ahead of the second unit and two-thirds ahead of third unit so that there is even pull at any one time.

6. Three electric motor units each made in accordance with claim 9, coupled to a common output shaft and being so mounted and controlled that at any one time only one solenoid in each motor unit is energized but the first motor unit having its solenoid energized one-third the length of a magnetizable element ahead of the second unit and two-thirds ahead of a third unit so that there is even pull at any one time.

* * * * *